W. P. Wood,
Mower.
No. 15796
Patented Sep. 23, 1856
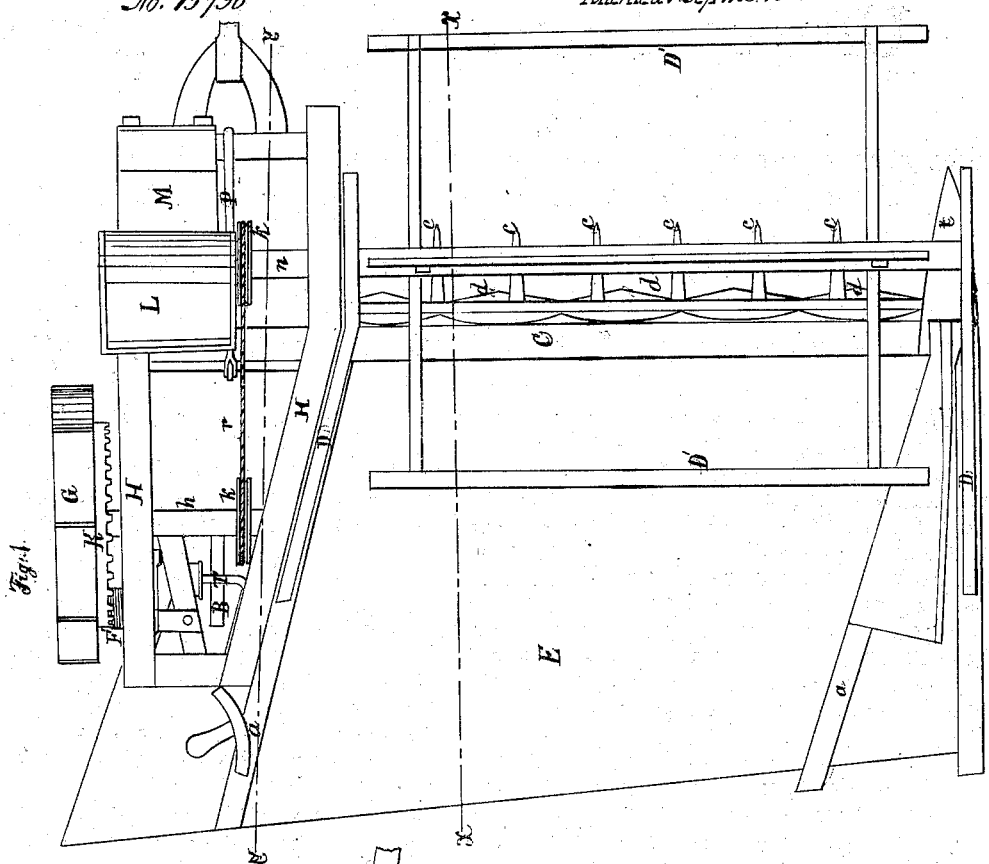
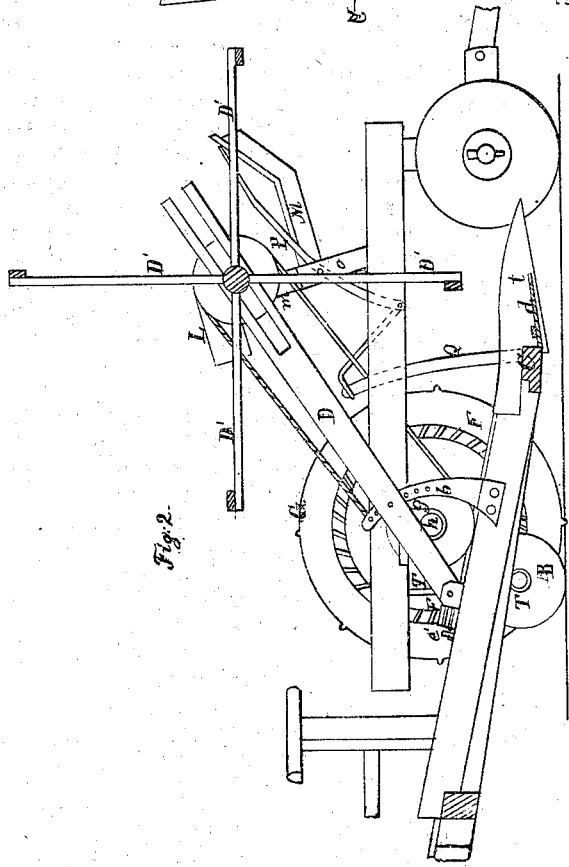
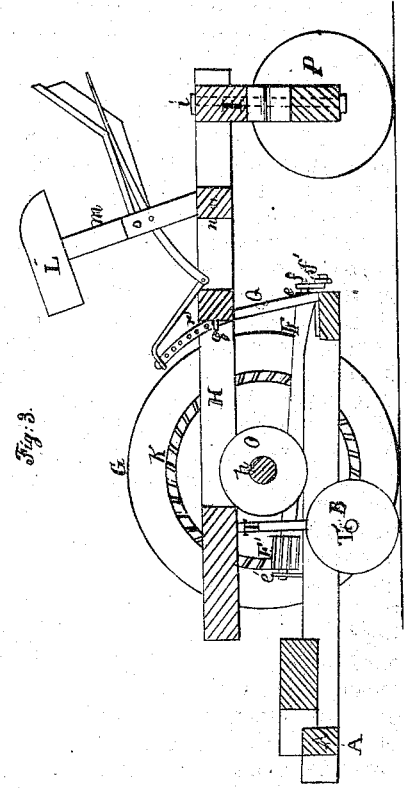

UNITED STATES PATENT OFFICE.

WILLIAM P. WOOD, OF WASHINGTON, DISTRICT OF COLUMBIA, ASSIGNOR TO SAML. DE VAUGHAN AND WM. P. WOOD, OF SAME PLACE.

IMPROVEMENT IN REAPING AND MOWING MACHINES.

Specification forming part of Letters Patent No. 15,796, dated September 23, 1856.

*To all whom it may concern:*

Be it known that I, WILLIAM P. WOOD, of the city of Washington, in the District of Columbia, have invented a new and useful Improvement in Reaping and Mowing Machines, of which the following is a full, clear, and exact description, reference being had to the accompanying drawings of the same, in which—

Figure 1 represents a plan of a machine embracing my improvements; Fig. 2, a section of the same through the line $x\ x$ of Fig. 1, and Fig. 3 a similar view through the line $y\ y$ of Fig. 1.

My invention consists in the particular manner of combining and arranging, with a main frame rigidly supported at its forward end by a pair of truck-wheels to prevent the oscillation of the driver's seat and to relieve the horses' necks from the weight or strain exerted upon them in raising the cutter-bar, a balanced frame for the support of the platform and cutting apparatus when mounted upon two independent wheels or axes in a line with and in rear of the axis of the driving-wheel and of equal diameter, so that when the cutter-bar is raised it will rise evenly, or in a line parallel with the surface of the ground—a point that cannot be accomplished when the frame is supported upon axes of different heights from the ground—and in connection with the lever or stanchion-brace that raises the machine, it having its fulcrum upon the main frame, the finger-bar can be raised or lowered without throwing any weight or strain upon the tongue of the machine or hinging the latter to the former; but as the frame to which the cutter-bar is secured is not mounted upon the axis of the driving-wheel, but upon an axis having nothing in common with the other, it will be apparent that the teeth upon the driving-wheel must be cut at a peculiar angle to enable the machine to operate the knives, this angle being in a line with the mean angle at which the shaft which communicates motion to the knives is set, when the cutter-bar is raised and lowered, the teeth when thus cut being beveled off so that their conformation shall be oval, in order to render my combination effectual.

To enable others skilled in the art to make, construct, and use my invention, I will now proceed to describe it in detail, omitting such parts of the machine as are common to others and unnecessary to the full understanding of my improvements.

In the accompanying drawings, A represents the balance-frame, mounted upon and supported by two wheels, B, of equal diameter and equidistant from the finger-bar C. Upon the side rails, $a\ a$, of this frame, and immediately over the axis of motion, are hinged two bars, D, extending forward for the purpose of supporting the reel D', these arms being hinged so that the reel may be raised or lowered, as circumstances may require, they being supported and held at any required height by curved stands $b$, secured upon the side rails above mentioned, a series of holes being passed through them for the reception of a pin that passes through the reel-supporters D and the stands. On the rear part of this frame, and in the rear of the horses, is located a raker's stand or seat for the greater convenience of raking off the grain and depositing it in the track of the horses, the platform E and frame being made angular for that purpose. On the ends of the side rails, $a$, and over the finger-bar, are secured hollow cast-metal shoes $t$, or dividers, for the double purpose of dividing the grain and supporting and guiding the ends of the cutter bar or knife, the outside of the one next the standing grain protecting the knife as it is operated from the grain as the machine advances.

Upon the end of the finger-bar C next the horses is secured a standard, $e$, having a mortise in it, forming a bearing for the driving-shaft F, its rear end, upon which the pinion F' is secured, being mounted and working in a similar bearing, $e'$, secured to the brace-beams of the frame A. On the front end of the shaft F is secured a crank, $f$, and pitman-rod $f'$, connecting with the knife $d$, and through which motion is communicated to the latter from the driving-wheel.

On the inside of the side rails of the main frame H are secured hangers T, supporting on their lower end a shaft, T', which forms the inner axes of the balance-frame A, these constituting the rear connection between it and the main frame. Upon this shaft T' is or may be mounted a wheel, B, for the better support of that end of the frame, although it may, if deemed advisable, be dispensed with entirely.

To the lower side of the side beams of the frame H are secured boxes $g$, in which the shaft $h$ of the driving-wheel G is supported and works, the forward end of this frame being supported upon a truck-carriage, I, to which it is connected by means of a king-bolt, $i$, upon which the truck-carriage swivels in turning the machine, the tongue being hinged to it in front in such manner as to be free to play up and down as it accommodates itself to the inequalities of the ground.

Upon the inside of the driving-wheel G is cast or otherwise secured in any suitable manner a cogged wheel, K, and gearing into the pinion F' on the driving-shaft F, the teeth of which are cast or cut at an angle corresponding with the mean angle at which the shaft F is set to it when the finger-bar is raised to its extreme range and lowered to the same degree for which it is intended to be used, the teeth then being beveled off at both ends, so as to form an oval-shaped tooth to enable the pinion to turn as the finger-bar is raised and lowered without impinging upon its face, to which it would otherwise be liable, because of the axis of motion of the frame being situated forward of the axis of motion of the pinion, causing the latter to have a sliding motion backward as the finger-bar is raised, and forward when lowered; or, instead of using the angular and oval shaped gearing just described, pin-teeth may be used; but I prefer the former, as they are stronger and more durable.

Upon the inner end of the shaft of the driving-wheel is mounted a pulley, $k$, from which a band, $r$, leads round another pulley, $k'$, secured upon the end of the reel, from which motion is communicated to the end of the reel as the machine advances.

From the frame H rise standards $m$, upon the top of which is secured the driver's seat L, a foot-board, M, being attached to their front sides. At the side of the inner stand $m$, upon a cross-beam, $n$, rises another standard, $o$, through a slot in which passes a hinged lever, P, to which it is pivoted by a bolt, $p$, its forward end extending along by the foot-board M, convenient to the driver's foot, by whom the lever is operated, its rear end being connected to the upper end of the bifurcated stanchion-brace Q, whose lower ends are secured to the finger-bar C, the upper end being passed through a guide staple, $q$, secured to a cross-beam of the frame H, this stanchion and staple forming the front connection between the balance-frame A and main frame H. Through the upper end of the stanchion are pierced a series of holes for the reception of a pin, $r'$, which, when the machine is at work, rests upon the staple $q$, thus supporting the front of the balance-frame, and which, by the passing of the pin through a higher or lower hole, causes the machine to cut high or low, as may be desired. By this peculiar arrangement of the lever for raising the cutting apparatus the driver, when occasion should require, can raise the finger-bar by pressing the lever P with his foot without for a moment withdrawing his attention from the horses, the importance of which will be apparent to all conversant with the use of reaping-machines.

I do not claim a balance-frame supported and turning upon an axis of motion independent of the axis of motion of the driving-wheel, of itself; but What I do claim is—

A balance-frame, A, supported and turning upon an axis of motion back of the axis of the driving-wheel, when used in connection with angular or oval-shaped gearing or its equivalent, and the bifurcated stanchion-brace Q, in combination with a main frame, H, rigidly supported at its forward end upon a truck-carriage, I, or wheels, the whole being constructed, arranged, and operated in the manner substantially as described.

In testimony whereof I hereunto set my hand this 27th day of May, A. D. 1856.

WILLIAM P. WOOD.

Witnesses:
ARTHUR C. WATKINS,
P. HANNAY.